United States Patent [19]

Tambo

[11] Patent Number: 5,384,157
[45] Date of Patent: Jan. 24, 1995

[54] TUNGSTEN OXIDE FILM, PROCESS FOR PRODUCING SAME AND ELECTROCHROMIC DEVICE USING SAME

[75] Inventor: Fumiaki Tambo, Minami-Ashigara, Japan

[73] Assignee: Fuji Xerox Co., Ltd., Tokyo, Japan

[21] Appl. No.: 990,747

[22] Filed: Dec. 15, 1992

[30] Foreign Application Priority Data

Dec. 20, 1991 [JP] Japan .................. 3-354309

[51] Int. Cl.⁶ ............................................. B05D 1/00
[52] U.S. Cl. .............................. 427/126.3; 427/123; 427/376.2
[58] Field of Search ............. 427/126.3, 123, 376.2; 428/702

[56] References Cited

U.S. PATENT DOCUMENTS

| | | | |
|---|---|---|---|
| 4,508,792 | 4/1985 | Ishiwata | 428/702 |
| 4,537,826 | 8/1985 | Miyamura | 428/702 |
| 5,034,246 | 7/1991 | Mance et al. | 427/126.3 |

FOREIGN PATENT DOCUMENTS

| | | | |
|---|---|---|---|
| 41760 | 4/1979 | Japan | 427/126.3 |
| 146420 | 11/1980 | Japan | 428/702 |
| 146421 | 11/1980 | Japan | 428/702 |
| 58-110444 | 7/1983 | Japan . | |

OTHER PUBLICATIONS

Chem. Mater., vol. 2, No. 5, p. 484 (1990).

*Primary Examiner*—Shrive Beck
*Assistant Examiner*—Vi Duong Dang
*Attorney, Agent, or Firm*—Oliff & Berridge

[57] ABSTRACT

A process for producing a tungsten oxide film which comprises the steps of: reacting a tungstate with a salt of an organic compound represented by formula (I) to obtain a tungstic acid compound; mixing the tungstic acid compound with an organic solvent to prepare a composition; and removing an organic substance and the solvent from the composition:

$$R_1R_2R_3NH^+X^- \qquad (I)$$

wherein $R_1$, $R_2$, and $R_3$ each represents a hydrogen atom or a saturated or unsaturated hydrocarbon group having from 1 to 20 carbon atoms, and $X^-$ represents a halogen atom. A tungsten oxide film obtained by the above-described process and an electrochromic device comprising the tungsten oxide film.

6 Claims, No Drawings

1

TUNGSTEN OXIDE FILM, PROCESS FOR PRODUCING SAME AND ELECTROCHROMIC DEVICE USING SAME

FIELD OF THE INVENTION

The present invention relates to a tungsten oxide film, a process for the production thereof, and an electrochromic device (hereinafter referred to as "ECD") using the same.

BACKGROUND OF THE INVENTION

Electrochromic metal oxide films conventionally used in electronic devices such as display elements, light modulation elements, etc. are generally formed by a vacuum evaporation method. However, the vacuum evaporation method has problems in that the production apparatus is expensive and the productivity is low. The methods are generally disadvantageous in mass productivity and simplicity and are not always an excellent method.

As a process for producing a thin film-form metal oxide by a coating method using an inexpensive production apparatus, there has been proposed a process called MOD (metallo-organic deposition) process wherein an organometallic compound is decomposed by heating and firing to thereby obtain the thin film of the corresponding metal oxide, as described, e.g., in JP-A-58-110444 and Chem. Mater., vol. 2, p. 484 (1990). The term "JP-A" as used herein means an "unexamined published Japanese patent application".

However, processes conventionally proposed are not fully satisfying with respect to an adhesion strength between a metal oxide film and a substrate, the uniformity of the film, productivity, the production cost, and the change in absorbance during color appearance of the electrochromic device.

The present invention has been accomplished with a view to solve problems associated with conventional processes.

SUMMARY OF THE INVENTION

An object of the present invention is to provide a process for producing a tungsten oxide film which is uniform, has high adhesion to a substrate, is excellent in productivity and inexpensive, and exhibits a great change in absorbance during color appearance.

Another object of the present invention is to provide a tungsten oxide film produced by the above-described process.

Still another object of the present invention is to provide an electrochromic device (ECD) using the above-described tungsten oxide film.

Other objects and effects of the present invention will be apparent from the following description.

The present inventors have made studies and found that the objects of the present invention can be achieved by removing an organic substance and a solvent from a composition containing a specific tungstic acid compound.

The present invention has been accomplished on the basis of this finding.

The present invention relates to a process for producing a tungsten oxide film which comprises the steps of: reacting a tungstate with a salt of an organic compound represented by formula (I) to obtain a tungstic acid compound; mixing the tungstic acid compound with an organic solvent to prepare a composition; and removing an organic substance and the solvent from the composition:

$$R_1R_2R_3NH^+X^- \qquad (I)$$

wherein $R_1$, $R_2$, and $R_3$ each represents a hydrogen atom or a saturated or unsaturated hydrocarbon group having from 1 to 20 carbon atoms, and $X^-$ represents a halogen atom.

The present invention also relates to a tungsten oxide film obtained by the above-described process.

The present invention further relates to an electrochromic device comprising the above-described tungsten oxide film.

DETAILED DESCRIPTION OF THE INVENTION

Preferred examples of the tungstic acid compound used in the present invention include a compound represented by formula (II):

$$(R_1R_2R_3NH^+)_2WO_4^{2-} \qquad (II)$$

wherein $R_1$, $R_2$, and $R_3$ each represents a hydrogen atom or a saturated or unsaturated hydrocarbon group having from 1 to 20 carbon atoms. It is further preferred that $R_1$ and $R_2$ each represents a hydrogen atom, and $R_3$ represents a saturated or unsaturated hydrocarbon group having from 6 to 20 carbon atoms.

In the process of the present invention, a tungstate is reacted with a salt of an organic compound represented by formula (I) to form a tungstic acid compound.

Examples of the tungstate include $NaHWO_4$, $Na_2WO_4$, $KHWO_4$, and $K_2WO_4$.

The salt of an organic compound represented by formula (I) is obtained by treating an amine compound with a halogen-containing compound such as HCl, HBr, and HI. Preferred examples of the amine compound are listed below along with the chemical formulae thereof:

| | |
|---|---|
| n-Hexylamine | $C_6H_{13}NH_2$ |
| 1,3-Dimethyl-n-butylamine | $(CH_3)_2CHCH_2CH(CH_3)NH_2$ |
| 3-Amino-2,2-dimethylbutane | $CH_3CH(NH_2)C(CH_3)_3$ |
| Di-n-propylamine | $(C_3H_7)_2NH$ |
| Diisopropylamine | $[(CH_3)_2CH]_2NH$ |
| N-n-Butylethylsimine | $C_4H_9NHC_2H_5$ |
| N-tert-Butylethylamine | $(CH_3)_3CNHC_2H_5$ |
| N-n-Butyldimethylamine | $C_4H_9N(CH_3)_2$ |
| Triethylamine | $(C_2H_5)_3N$ |
| n-Heptylamine | $C_7H_{15}NH_2$ |
| 2-Heptylamine | $C_5H_{11}CH(NH_2)CH_3$ |
| 4-Heptylamine | $C_3H_7CH(NH_2)C_3H_7$ |
| N-sec-Butyl-n-propylamine | $C_2H_5CH(CH_3)NHC_3H_7$ |
| n-Octylamine | $C_8H_{17}NH_2$ |

| -continued | |
|---|---|
| 2-Ethylhexylamine | $CH_3CH_2CH_2CH_2CH(C_2H_5)CH_2NH_2$ |
| 1,5-Dimethylhexylamine | $(CH_3)_2CHCH_2CH_2CH_2CH(CH_3)NH_2$ |
| 1,1,3,3-Tetramethylbutylamine | $(CH_3)_3CCH_2C(CH_3)_2NH_2$ |
| 2-Aminooctane | $C_6H_{13}CH(NH_2)CH_3$ |
| Di-n-butylamine | $(C_4H_9)_2NH$ |
| Di-sec-butylamine | $[C_2H_5CH(CH_3)]_2NH$ |
| Diisobutylamine | $[(CH_3)_2CHCH_2]_2NH$ |
| N,N-Diisopropylethylamine | $[(CH_3)_2CH]_2NC_2H_5$ |
| n-Nonylamine | $C_9H_{19}NH_2$ |
| Tri-n-propylamine | $(C_3H_7)_3N$ |
| 1-Aminodecane | $C_{10}H_{21}NH_2$ |
| Di-n-amylamine | $(C_5H_{11})_2NH$ |
| Diisoamylamine | $[(CH_3)_2CHCH_2CH_2]_2NH$ |
| N,N-Dimethyl-n-octylamine | $(CH_3)_2NC_8H_{17}$ |
| 1-Aminoundecane | $C_{11}H_{23}NH_2$ |
| Laurylamine | $C_{12}H_{25}NH_2$ |
| Di-n-hexylamine | $(C_6H_{13})_2NH$ |
| Tri-n-butylamine | $(C_4H_9)_3N$ |
| Triisobutylamine | $[(CH_3)_2CHCH_2]_3N$ |
| n-Tridecylamine | $C_{13}H_{27}NH_2$ |
| n-Tetradecylamine | $C_{14}H_{29}NH_2$ |
| N,N-Dimethyl-n-doclecylamine | $(CH_3)_2NC_{12}H_{25}$ |
| 1-Aminopentadecane | $C_{15}H_{31}NH_2$ |
| Tri-n-amylamine | $(C_5H_{11})_3N$ |
| Triisoamylamine | $[(CH_3)_2CHCH_2CH_2]_3N$ |
| n-Hexadecylamine | $C_{16}H_{33}NH_2$ |
| Di-n-octylamine | $(C_8H_{17})_2NH$ |
| Di(2-ethylhexyl)amine | $[(CH_3CH_2CH_2CH_2CH(C_2H_5)CH_2]_2NH$ |
| N,N-Dimethyl-n-tetradecylamine | $(CH_3)_2NC_{14}H_{29}$ |
| 1-Aminoheptadecane | $C_{17}H_{35}NH_2$ |
| N-Methyldi-n-octylamine | $CH_3N(C_8H_{17})_2$ |
| Stearylamine | $C_{18}H_{37}NH_2$ |
| Tri-n-hexylamine | $(C_6H_{13})_3N$ |
| N,N-Dimethyl-n-hexadecylamine | $(CH_3)_2NC_{16}H_{33}$ |
| Oleylamine | $CH_3(CH_2)_7CH\!=\!CH(CH_2)_8NH_2$ |
| 1-Aminononadecane | $C_{19}H_{39}NH_2$ |
| N-Methyl-n-octadecylamine | $CH_3NHC_{18}H_{37}$ |
| 1-Aminoeicosane | $C_{20}H_{41}NH_2$ |
| Di-n-decylamine | $(C_{10}H_{21})_2NH$ |
| N,N-Dimethyl-n-octadecylamine | $(CH_3)_2NC_{18}H_{37}$ |

Among the above compounds, 2-ethylhexylamine is particularly preferably used.

The method for treating the amine compound with the halogen-containing compound is not particularly limited. For example, water and the halogen-containing compound may be added to the amine compound to prepare the salt of an organic compound. The order of addition is not particularly restricted.

The salt of an organic compound and the tungstate are then reacted with each other to form the tungstic acid compound. The method for the reaction is not particularly limited and can be carried out in the following manner, for example: An aqueous solution containing a tungstate and a strong alkali (e.g., sodium hydroxide) is gradually added to a solution of the salt of an organic compound. At this time, an amine compound as a starting material of the salt of an organic compound may be added to increase the solubility. The resulting ammonium tungstate as a tungstic acid compound is extracted from the reaction mixture with a highly volatile solvent such as methylene chloride or dichloromethane, and the solvent is removed by distillation to obtain a tungstic acid compound. The weight ratio of the tungstate to the salt of an organic compound is generally from 2/1 to 1/2, preferably from 1/1 to 1/1.1, when $NaHWO_4$ or $KHWO_4$ is used. It is generally from 1/1 to 1/4, preferably from 1/2 to 1/2.2, when $Na_2WO_4$ or $K_2WO_4$ is used.

The tungstic acid compound is then mixed with an organic solvent to prepare a composition. Any of organic solvents capable of dissolving the tungstic acid compounds can be used in the present invention. Examples of the organic solvents include aromatic compounds such as xylene and toluene; esters such as ethyl acetoacetate, benzyl acetate and dibutyl phthalate; and ketones such as acetylacetone and isophorone. These solvents may be used either alone or as a mixture of two or more of them. The ratio of the tungstic acid compound to the solvent in the composition is generally from ⅓ to 1/10 by weight.

The composition may further contain a thickener and other additives. For example, ammonium salt of unsaturated fatty acids such as 2-ethylhexylammonium linoleate may be added to the composition to improve the film forming properties after the heating and firing. When a pasty material is to be obtained by thickening, it is preferred to use a thickener as an additive. For example, conventional high-molecular materials such as polymethyl methacrylate can be used.

The tungsten oxide film of the present invention can be obtained by removing an organic substance and the solvent from the composition. The removal of the organic substance and the solvent is preferably conducted by heating and firing. For example, the composition is coated on an appropriate substrate and heated and fired to form the tungsten oxide film on the substrate. The heating means is not particularly limited, and a furnace, a laser beam, etc. can be employed.

The thickness of the tungsten oxide film of the present invention is generally from 0.05 to 2 μm, and preferably from 0.2 to 0.6 μm.

When the resulting tungsten oxide film is to be applied to an ECD, examples of the substrate include transparent electroconductive glasses such as ITO-coated glass and NESA glass and metallic substrate such as aluminum and stainless steel.

The composition can be coated thereon by an appropriate coating method. For example, when the composition is in the form of a liquid, roll coating method and dip coating method can be preferably used. When the composition is in the form of a paste, spin coating method and screen process printing can be preferably used. In the present invention, the composition can be deposited on a substrate by a direct drawing method such as an ink jet process.

The composition coated or deposited on the substrate can be then heated and fired, whereby the tungstic acid compound is heat-decomposed to form a tungsten oxide film as an oxide film. The firing temperature is generally from 400° to 700° C., preferably from 500° to 600° C. The firing time is generally from 1 to 120 minutes, preferably from 3 to 20 minutes.

The thus-prepared tungsten oxide film can be used as an ECD. Namely, ITO coated glass or NESA glass on which the tungsten oxide film is formed can be used as an ECD in an electrochromic cell.

The ECD according to the present invention has an advantage in that unevenness on the surface thereof is great and a change in absorbance during color appearance is great in comparison with a conventional ECD produced by the vacuum evaporation method. The reason for this unexpected result so far is not clearly known, but the favorable result is thought to be due to the fact that the decrease of the organic substance during firing is stepwise caused and unevenness on the surface of the film is influenced thereby.

The electrochromic cell using the ECD of the present invention can comprise the ECD, an electrode used as the opposing electrode to the ECD, and an electrolyte filled in a gap between the ECD and the opposing electrode.

Examples of the opposing electrode include those obtained by coating CrOx, MnO, CoOx, NiOx, IrO$_2$, RhOx or Prussian blue on ITO-coated glass, NESA glass, metallic substrates and the substrates themselves. Examples of the electrolyte include solutions obtained by dissolving a salt such as LiClO$_4$, LiBF$_4$, tetrabutylammonium tetrafluoroborate or tetrabutylammonium perchlorate in propylene carbonate or polyethylene oxide; semisolid high-molecular electrolytes obtained by dissolving a high-molecular material such as a salt such as lithium iodide and a high-molecular material such as polyvinyl butyral in an alkyl alcohol; and solid electrolytes such as zirconium oxide.

The present invention is now illustrated in greater detail with reference to Examples, but it should be understood that the present invention is not deemed to be limited thereto.

SYNTHESIS EXAMPLE 1

To 5.69 g of 2-ethylhexylamine, 20 ml of water and 40 ml of concentrated hydrochloric acid were added to prepare Solution A.

Separately, 5.00 g of tungstic acid, 16.0 g of sodium hydroxide and 60 ml of water were mixed to prepare Solution B.

Solution B was gradually added to Solution A. Further, 3.86 g of 2-ethylhexylamine was added thereto. The mixture was extracted with 60 ml of dichloromethane three times. The solvent was removed from the resulting organic layer by distillation, and 50 ml of xylene and 14.86 g of 2-ethylhexylammonium linoleate were added to the residue to obtain a 2-ethylhexylammonium tungstate-containing solution.

SYNTHESIS EXAMPLE 2

The procedure of Synthesis Example 1 was repeated except that 1.5 g of polymethyl methacrylate was used in place of 2-ethylhexylammonium linoleate to obtain a 2-ethylhexylammonium tungstate-containing solution.

SYNTHESIS EXAMPLE 3

To 3.16 g of triisobutylamide, 20 ml of water and 40 ml of concentrated hydrochloric acid were added to prepare Solution C.

Separately, 5.00 g of tungstic acid, 16.0 g of sodium hydroxide and 60 ml of water were mixed to prepare Solution D.

Solution D was gradually added to Solution C. Further, 4.08 g of triisobutylamine was added thereto. The mixture was extracted with 60 ml of dichloromethane three times. The solvent was removed from the resulting organic layer by distillation, and 50 ml of xylene was added to the residue to obtain a triisobutylammonium tungstate-containing solution.

EXAMPLE 1

ITO-coated glass was used as a substrate. The solution prepared in Synthesis Example 1 was coated on the substrate by means of a spin coater and fired in a muffle furnace at a peak temperature of 600° C. for 10 minutes to form a tungsten oxide film on the substrate. The tungsten oxide film formed had a thickness of 0.2 μm.

The ITO-coated glass having thereon the tungsten oxide film prepared above and an ITO-coated glass having thereon a NiO film as the opposing electrode were arranged so as to be spaced from each other by a gap of 20 μm, and a propylene carbonate solution containing LiClO$_4$ at a concentration of 1 mol/l was used as the electrolyte to prepare an electrochromic cell.

The tungsten oxide film in the electrochromic cell was used as the negative electrode. When DC voltage of 2 volts was applied thereto, the color of ECD was changed to blackish blue. Two minutes after the application of voltage, the change of absorbance at 700 nm ($\Delta OD_{700,2min}$) was 0.3. When the polarity was reversed and a voltage of 2 volts was applied thereto, blackish blue color disappeared. The color appearance and disappearance operation could be repeatedly made.

EXAMPLE 2

ITO-coated glass was used as a substrate. The solution prepared in Synthesis Example 1 was coated on the substrate by means of a spin coater and fired in a muffle furnace at a peak temperature of 600° C. for 10 minutes. This coating-firing operation was repeated three times to form a tungsten oxide film on the substrate. The tungsten oxide film formed had a thickness of 0.4 μm.

The ITO-coated glass having thereon the tungsten oxide film prepared above and an ITO-coated glass as the opposing electrode were arranged so as to be spaced from each other by a gap of 20 μm, and the following high-molecular semisolid electrolyte as the electrolyte was used to prepare an electrochromic cell.

| | |
|---|---|
| Lithium iodide | $4.7 \times 10^{-2}$ g |
| 2,3-Dimercapto-1-propanol | $8.7 \times 10^{-1}$ g |
| Tribromoacetic acid | 1.04 g |
| Polyvinyl butyral | 25 g |

| Butanol | 69 ml |

In the electrochromic cell, the tungsten oxide film was used as the negative electrode. When DC voltage of 2 volts was applied thereto, the color of ECD was changed to blue, and $\Delta OD_{700,2min}$ was 0.8. When the polarity was reversed and a voltage of 2 volts was applied thereto, blue color disappeared. The color appearance and disappearance operation could be repeatedly made.

EXAMPLE 3

ITO-coated glass was used as the substrate. The solution prepared in Synthesis Example 2 was coated on the substrate by means of a printing process using 400-mesh screen, and fired in a muffle furnace at a peak temperature of 600° C. for 10 minutes to form a tungsten oxide film on the substrate. The tungsten oxide film formed had a thickness of 0.3 μm.

The ITO-coated glass having thereon the tungsten oxide film prepared above and an ITO-coated glass as the opposing electrode were arranged so as to be spaced away from each other by a gap of 20 μm, and a propylene carbonate solution containing LiClO$_4$ at a concentration of 1 mol/l as the electrolyte was used to prepare an electrochromic cell.

In the electrochromic cell, the tungsten oxide film was used as the negative electrode. When DC voltage of 2 volts was applied thereto, the color of ECD was changed to blue, and $\Delta OD_{700,2min}$ was 0.3. When the polarity was reversed and a voltage of 2 volts was applied thereto, blue color disappeared. The color appearance and disappearance operation could be repeatedly made.

COMPARATIVE EXAMPLE 1

A tungsten oxide film of 0.2 μm in thickness was formed on ITO-coated glass by a conventional vacuum evaporation method.

The ITO-coated glass having thereon the tungsten oxide film formed above and an ITO-coated glass having thereon a NiO film as the opposing electrode were arranged so as to be spaced from each other by a gap of 20 μm, and a propylene carbonate solution containing LiClO$_4$ at a concentration of 1 mol/l as the electrolyte was used to prepare an electrochromic cell.

In the electrochromic cell, the tungsten oxide film was used as the negative electrode. When DC voltage of 2 volts was applied thereto, the color of ECD was changed to blackish blue, and $\Delta OD_{700,2min}$ was 0.2.

It will be understood from the above disclosure that according to the present invention, there can be obtained a tungsten oxide film which is uniform, has high adhesion to the substrate, is excellent in productivity and inexpensive and exhibits a great change in absorbance during color appearance.

In the electrochromic device using the above tungsten oxide film according to the present invention, the film is uniform, has high adhesion to the substrate and exhibits a great change in absorbance during color appearance, and hence the electrochromic device of the present invention is useful as display elements, light modulation elements, etc.

While the invention has been described in detail and with reference to specific examples thereof, it will be apparent to one skilled in the art that various changes and modifications can be made therein without departing from the spirit and scope thereof.

What is claimed is:

1. A process for producing a tungsten oxide film which comprises the steps of:
    reacting a tungstate with a salt of an organic compound represented by formula (I) to obtain a tungstic acid compound;
    mixing said tungstic acid compound with an organic solvent to prepare a composition;
    applying said composition onto a substrate; and heating said composition at sufficiently high temperature to remove said solvent from said composition and form a tungsten oxide film:

$$R_1R_2R_3NH^+X^- \quad (I)$$

wherein $R_1$, $R_2$, and $R_3$ each represents a hydrogen atom or a saturated or unsaturated hydrocarbon group having from 1 to 20 carbon atoms, and $X^-$ represents a halogen atom.

2. A process for producing a tungsten oxide film as claimed in claim 1, wherein said tungstic acid compound is a compound represented by formula (II):

$$(R_1R_2R_3NH^+)_2WO_4^{2-} \quad (II)$$

wherein $R_1$, $R_2$, and $R_3$ each represents a hydrogen atom or a saturated or unsaturated hydrocarbon group having from 1 to 20 carbon atoms.

3. A process for producing a tungsten oxide film as claimed in claim 1, wherein $R_1$ and $R_2$ each represents a hydrogen atom, and $R_3$ represents a saturated or unsaturated hydrocarbon group having from 6 to 20 carbon atoms.

4. The process for producing a tungsten oxide film as claimed in claim 1, wherein said organic substance and said solvent are removed by heating and firing.

5. A process for producing a tungsten oxide film, which comprises the steps of:
    reacting a tungstate with a salt of an organic compound represented by formula (I) to obtain a tungstic acid compound;
    mixing said tungstic acid compound with an organic solvent to prepare a composition;
    applying said composition onto a substrate; and heating said composition at sufficiently high temperature to remove said solvent from said composition and form a tungsten oxide film:

$$R_1R_2R_3NH^+X^- \quad (I)$$

wherein $R_1$, $R_2$, and $R_3$ each represents a hydrogen atom or a saturated or unsaturated hydrocarbon group having from 1 to 20 carbon atoms, and $X^-$ represents a halogen atom.

6. A process for producing a tungsten oxide film which comprises the steps of:
    reacting a tungstate with a salt of an organic compound represented by formula (I) to obtain a tungstic acid compound;
    mixing said tungstic acid compound with an organic solvent to prepare a composition;
    applying said composition onto a substrate; and heating said composition at sufficiently high temperature to remove said solvent from said composition and form a tungsten oxide film:

$$R_1R_2R_3NH^+X^- \quad (I)$$

wherein $R_1$, $R_2$, and $R_3$ each represents a hydrogen atom or a saturated or unsaturated hydrocarbon group having from 1 to 20 carbon atoms, and $X^-$ represents a halogen atom.

* * * * *